United States Patent [19]
Biondetti

[11] 3,885,283
[45] May 27, 1975

[54] PRESS ROLL
[75] Inventor: Mario Biondetti, Schio, Italy
[73] Assignee: Escher Wyss Aktiengesellschaft, Zurich, Switzerland
[22] Filed: Oct. 25, 1973
[21] Appl. No.: 409,644

[30] Foreign Application Priority Data
Oct. 26, 1972  Switzerland............................ 15679

[52] U.S. Cl............................................ 29/116 AD
[51] Int. Cl............................................ B21b 13/02
[58] Field of Search................. 29/116 AD, 113 AD

[56] References Cited
UNITED STATES PATENTS
3,618,190  11/1971  Vernazza et al. .............. 29/116 AD
3,672,018   6/1972  Junk et al. ...................... 29/116 AD
3,747,181   7/1973  Nykopp et al. ................. 29/113 AD
3,802,044   4/1974  Spillmann et al. ............. 29/113 AD
R26,219     6/1967  Kusters et al. ............. 29/116 AD X Primary Examiner—Alfred R. Guest
Attorney, Agent, or Firm—Pennie & Edmonds

[57] ABSTRACT
The press roll is made of a fixed beam and a rotatable roll shell with various hydrostatic supporting elements in the beam supporting the shell for rotation on the beam. A provision is made to allow the ends of the shell to move radially of the beam. This is accomplished by the use of a guide means in each end of the shell which allows rotation of the shell but which is keyed with the beam to move only in a radial plane relative to the beam without rotating.

12 Claims, 6 Drawing Figures

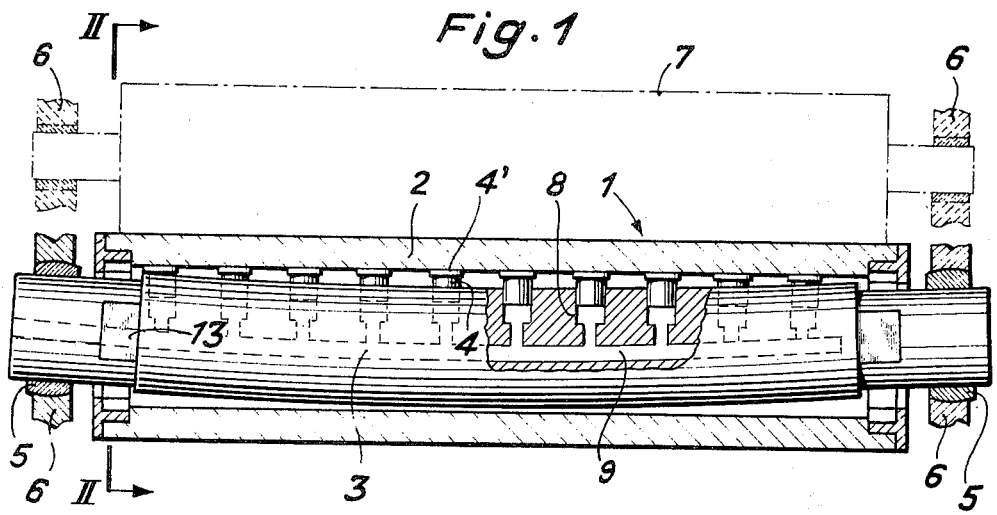
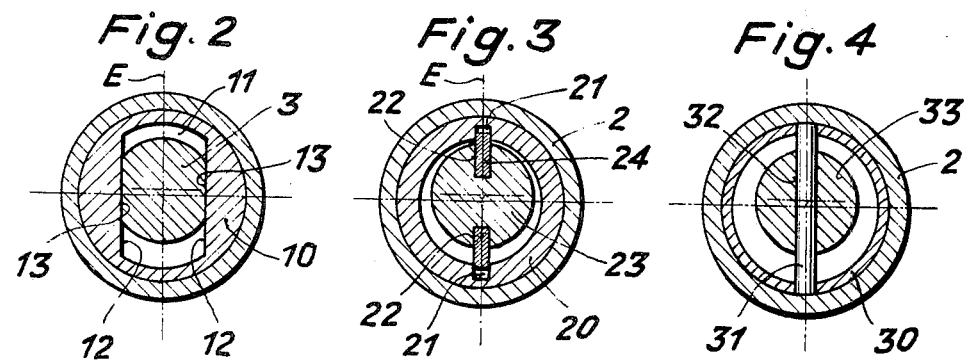
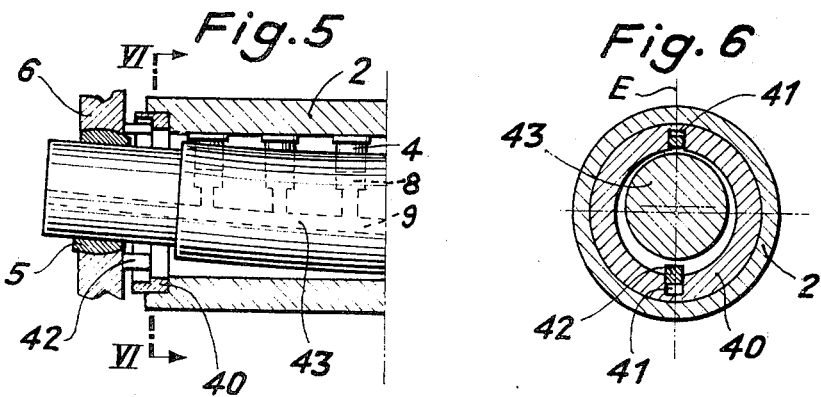

PRESS ROLL

Press rolls have been known in which a rotatable roll shell has been rotatably mounted on a fixed beam by means of hydrostatic supporting elements, such as pistons, which permit the shell to rotate relative to the beam while also forcing the shell into a predetermined configuration. Press rolls of this type have been used to apply pressure to webs of material, such as paper. The hydrostatic supporting elements, for example, as described in Swiss Pat. application 9428/71, now Swiss Pat. No. 514,088, or in the corresponding U.S. Pat. No. 3,802,044, permit the applied pressure to be distributed as desired. Generally, these supporting elements are supported on the beam which is deflected and press on the interior of the roll shell. It is therefore possible, for example, to compensate for deflection so that the axis of the shell remains straight under a load. There may be one or more rows of hydrostatic supporting elements, or alternatively the beam may have a single load supporting element.

In known press rolls of this type, the ends of the shell are usually connected to the beam by radial bearings which permit the shell to rotate relative to the beam but prevent the shell from moving radially of the beam. This, however, has the disadvantage that the bearings are loaded by statically unpredictable forces, making it difficult to regulate the forces acting where the press roll and a cooperating roll are in contact. Also, these known press rolls require complicated mechanisms in order to move the press roll and a cooperating roll during operation.

Accordingly, it is an object of the invention to provide a press roll in which a roll shell is free to move radially of a support beam at the ends of the shell.

It is another object of the invention to be able to use simplified regulating devices to apply pressure in a press roll.

It is another object of the invention to be able to deform a press roll shell onto a cooperating member in a manner to effect a uniform pressure or a predetermined pattern of pressure.

It is another object of the invention to eliminate the need for a structure to raise and lower a press roll or a cooperating roll.

Briefly, the invention provides a press roll having a fixed beam, a rotatable shell and at least one hydrostatic supporting element between the beam and shell wherein the shell is freely movable relative to the beam in the radial direction and the dimensions of the supporting element are such that the element can follow the movements of the shell.

The roll is therefore able to adapt itself freely to the hydraulic pressure applied by the supporting element or elements. If the stroke of the hydrostatic supporting elements is long enough, which is easily done, the shell can, for example, be lowered far enough by the supporting elements to eliminate the need for a swivel mounting of the cooperating roll and for the associated equipment otherwise needed to operate the machine containing the press roll.

In order to implement the mounting of the shell on the beam, a guide means is provided, for example, at each end of the shell to guide the shell in the same direction as the supporting plane. This prevents any transverse motion of the shell relative to the supporting elements.

The guide means, in one embodiment, includes a guide ring rotatably mounted in the shell at at least one end of the shell; the ring being movable relative to the beam in parallel to the supporting plane. In this case, the supporting ring, or thrust ring, may be guided either on the beam or on a frame portion connected to the beam.

These and other objects and advantages of the invention will become more apparent from the following detailed description and appended claims taken in conjunction with the accompanying drawing in which:

FIG. 1 diagrammatically illustrates a sectional view through a press roll according to the invention;

FIG. 2 illustrates a view taken on line II—II of FIG. 1;

FIG. 3 illustrates a view similar to FIG. 2 of a modified guide means according to the invention;

FIG. 4 illustrates a view similar to FIG. 2 of another modified guide means according to the invention;

FIG. 5 illustrates a fragmentary view of a further modification according to the invention; and FIG. 6 illustrates a view taken on line VI—VI of FIG. 5.

Referring to FIG. 1, a press roll 1, which may, for example, form part of a paper-making machine, comprises a cylindrical roll shell 2 which is rotatably mounted about a beam 3 by means of a plurality of hydrostatic supporting elements such as pistons 4. Each supporting element 4 is mounted in guided manner within the beam 3 and supports an internal contact surface on the shell 2 via a pad 4'. The elements 4 are guided in cylinders 8 in the beam and are operated by hydraulic pressure fluid supplied to those cylinders from a pressure fluid source (not shown), for example, along bores 9 in the beam 3. The pads 4' on the supporting elements 4 contain hydrostatic lubricating recesses which may be connected into the supply of hydraulic fluid so that the shell 2 can slide freely while rotating. The support provided by the hydrostatic elements 4 means that the shell 2 is supported along its entire length by forces which depend only on the hydraulic pressure and on the area of the supporting elements 4 exposed to the pressure.

The beam, which is straight under no load, bends resiliently when loaded. In FIG. 1, this deflection is exaggerated for the sake of clarity. Since the beam 3 is subject to deflection, each end is carried via a spherical bearing 5 in a frame 6. The bearings 5 permit deflection of the beam 3 as illustrated, but prevent the beam 3 (by means not shown) from turning relative to the frame 6. As shown by chain lines, a cooperating roll 7 cooperates with the roll 1 and is also mounted in the frame 6.

Referring to FIGS. 1 and 2, a guide means in the form of a guide ring 10 is rotatably mounted in each end of the shell 2. The ring 10 may have plain bearings as illustrated, or alternatively rolling bearings may be provided between the ring 10 and the shell 2. The guide ring 10 contains an elongated aperture 11 with parallel guide surfaces 12 which cooperate with flats 13 on the beam 3.

The guide surfaces 12 of the ring 10 and the flats 13 allow the shell 2 to move relative to the beam 3 in a plane E. This plane E is the supporting plane, in which the forces of the hydrostatic elements 4 are applied. If these elements 4 are arranged in a straight line along the beam 3, the supporting plane E will be formed by their axes of motion. If the supporting elements 4 are arranged in more than one axial row, the supporting plane may (for identical supporting element forces) be the plane of symmetry of the arrangement. However, the supporting plane E may deviate slightly from the plane of motion of the cylindrical shell 2 and may, for example, be parallel to this plane of motion.

Referring to FIG. 3, a guide means may also be in the form of a ring 20 provided with guide grooves 21 which are situated opposite guide grooves 22 in the beam 23. The grooves 21 and 22 are on a line extending in the supporting plane E and passing through the axis of the beam 23 and shell 2. The grooves 21, 22 are connected by connecting members 24 which are movable therein and which allow the guide ring 20 to move relative to the beam 23 in the plane E, but prevent relative rotation between the beam 23 and ring 20.

Referring to FIG. 4, a guide ring 30 is provided with a pin 31 extending diametrically across the ring 30 and running in a bore 32 in the beam 33. The common axis of the bore 32 and pin 31 lies in the supporting plane E.

Referring to FIGS. 5 and 6, a guide ring 40 is rotatably mounted in the shell 2 and is guided in the supporting plane E in the frame 6 which supports the end of the beam 43. To this end, the ring 40 contains radial, diametrically opposite guide grooves 41 while projections 42 are fixed to the frame 6 to engage in the guide grooves 41. This arrangement could, of course, be reversed, the projections being on the guide ring and the grooves in the frame or in a member rigidly connected to the frames.

It will be appreciated that in all embodiments, slight deviations of the supporting plane E from the direction of motion of the cylindrical shell 2 are possible or even advantageous. For example, the shell 2 may move with its axis parallel to the plane E or even inclined at a small angle to this plane.

In accordance with the invention, it is possible to deform the shell in such a manner as to hug a cooperating member, e.g. another roll, under a pressure which may be uniform over the length of the member or which may vary from one place to another. Further, the invention allows the press roll to be easily removed from the shell.

What is claimed is:

1. A press roll comprising:
   a fixed axial beam;
   a rotatable roll shell disposed about said beam to move in a free manner in a radial direction relative to said beam; and
   a plurality of hydrostatic supporting elements guidably mounted in said beam in a predetermined supporting plane to rotatably support said shell on said beam and to follow movements of said shell, said supporting elements constituting the sole means to restrict motion of said shell with respect to said beam in said plane.

2. A press roll as set forth in claim 1 further comprising at least one guide means for guiding said shell parallel to said supporting plane.

3. A press roll as set forth in claim 2 wherein said guide means includes a guide ring rotatably mounted within one end of said shell and mounted relative to said beam to move transversely of a longitudinal axis of said beam.

4. A press roll as set forth in claim 3 wherein said guide ring is slidably mounted on said beam.

5. A press roll as set forth in claim 4 wherein said beam has a pair of flats thereon and said guide ring has an elongated aperture with parallel guide surfaces therein in sliding contact with said flats.

6. A press roll as set forth in claim 4 wherein said beam has a pair of oppositely disposed grooves and said guide ring has a pair of opposed grooves, each said groove being disposed in said supporting plane and wherein said guide means further includes connecting members located in each of a groove in said beam and a groove in said guide ring to connect said guide ring to said beam.

7. A press roll as set forth in claim 4 wherein said guide means further includes a radially disposed pin passing through said beam and said guide ring.

8. A press roll as set forth in claim 3 which further comprises a fixed frame mounting each end of said beam therein and wherein said guide means is movably mounted on said frame.

9. A press roll as set forth in claim 8 wherein one of said guide ring and said frame has guide grooves therein and the other of said guide ring and said frame has projections mounted thereon and projecting into a respective groove in said one of said guide ring and said frame.

10. A press roll comprising:
    a fixed axial beam;
    a roll shell;
    a plurality of hydrostatic supporting elements guidably disposed in said beam in a predetermined supporting plane to rotatably support said shell on said beam, said supporting elements being sized to follow movements of said shell, said supporting elements constituting the sole means to restrict motion of said shell with respect to said beam in said plane; and
    means for guiding said shell in a radial direction in freely movable relation to said beam during rotation of said shell on said beam.

11. A press roll comprising a beam, means supporting the beam at its ends and restraining the beam against rotation about its long dimension, a rotatable roll shell engaged with clearance about the beam, a plurality of hydrostatic supporting elements distributed lengthwise of the beam in position to exert stress on the inner surface of the shell in a common supporting plane substantially parallel to the long dimension of the beam, and means to permit, in response to force exerted on the exterior thereof, parallel translational motion of the shell in a direction substantially perpendicular to the long dimensions of the beam and shell, said last-named means including at each end of the beam:
    a. a bearing ring engaged between the beam and shell for rotation of the shell with respect to the ring, and
    b. means coupling the bearing ring to the beam to allow translation of the bearing ring with respect to the beam in a direction transverse of the long dimension of the beam while preventing relative rotation of the bearing ring and beam.

12. A press roll according to claim 11 wherein said coupling means comprise two pairs of parallel plane mating surfaces on the beam and bearing ring.

* * * * *